US010994665B2

(12) United States Patent
Matsuba et al.

(10) Patent No.: US 10,994,665 B2
(45) Date of Patent: May 4, 2021

(54) VEHICLE DISPLAY SYSTEM

(71) Applicant: MAZDA MOTOR CORPORATION, Hiroshima (JP)

(72) Inventors: Yoshiaki Matsuba, Hiroshima (JP); Tomonori Ohtsubo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/754,366

(22) PCT Filed: Oct. 10, 2018

(86) PCT No.: PCT/JP2018/037735
§ 371 (c)(1),
(2) Date: Apr. 7, 2020

(87) PCT Pub. No.: WO2019/074005
PCT Pub. Date: Apr. 18, 2019

(65) Prior Publication Data
US 2020/0238921 A1 Jul. 30, 2020

(30) Foreign Application Priority Data
Oct. 10, 2017 (JP) .............................. JP2017-196564

(51) Int. Cl.
*B60R 11/02* (2006.01)
*B60R 1/00* (2006.01)
(Continued)

(52) U.S. Cl.
CPC .......... *B60R 11/0264* (2013.01); *B60R 1/001* (2013.01); *B60R 1/12* (2013.01);
(Continued)

(58) Field of Classification Search
CPC B60R 1/00; B60R 1/002; B60R 1/006; B60R 1/007; B60R 1/02; B60R 1/06;
(Continued)

(56) References Cited

U.S. PATENT DOCUMENTS 10,525,883 B2 * 1/2020 Goseberg ........... H04N 5/23238
10,699,376 B1 * 6/2020 Kwok .................. G06T 3/4038
(Continued)

FOREIGN PATENT DOCUMENTS

EP 2257065 A1 12/2010
JP 2011-251681 A 12/2011

OTHER PUBLICATIONS

International Search Report issued in PCT/JP2018/037735; dated Dec. 4, 2018.
(Continued)

*Primary Examiner* — Jeremiah C Hallenbeck-Huber
(74) *Attorney, Agent, or Firm* — Studebaker & Brackett PC

(57) ABSTRACT

Disclosed is a vehicle display system (1) for displaying an image of surroundings of a vehicle. The vehicle display system (1) includes: a display (18a) configured to display an image thereon; a camera (4, 6, 8, 10) mounted on the vehicle and configured to image surroundings of the vehicle; and a display control unit (20) configured to subject an image captured by the camera to mask processing, using a mask image (MR, MF) including a semi-transparent portion (M3, M4, M14, M16) corresponding to a vehicle body, and a portion (M8, M18, M19) corresponding to a window of the vehicle and having a transmittance lower than that of the portion corresponding to the vehicle body, to generate a masked image (D), and cause the masked image to be displayed on the display.

7 Claims, 7 Drawing Sheets

(51) Int. Cl.
  *B60R 1/12* (2006.01)
  *B60R 11/04* (2006.01)

(52) U.S. Cl.
  CPC .......... *B60R 11/0235* (2013.01); *B60R 11/04* (2013.01); *B60R 2001/1215* (2013.01); *B60R 2300/303* (2013.01); *B60R 2300/304* (2013.01); *B60R 2300/307* (2013.01); *B60R 2300/8026* (2013.01); *B60R 2300/8066* (2013.01); *B60R 2300/8093* (2013.01)

(58) Field of Classification Search
  CPC ......... B60R 2001/1253; B60R 11/0264; B60R 2300/303; B60R 2300/305; B60R 2300/60; B60R 2300/605; B60R 2300/802
  See application file for complete search history.

(56) References Cited

U.S. PATENT DOCUMENTS

| | | | | |
|---|---|---|---|---|
| 2008/0246843 | A1* | 10/2008 | Nagata | B60R 1/00 348/148 |
| 2009/0237268 | A1 | 9/2009 | Tomoyuki et al. | |
| 2010/0066833 | A1* | 3/2010 | Ohshima | B60R 1/00 348/148 |
| 2012/0249789 | A1* | 10/2012 | Satoh | G06K 9/00832 348/143 |
| 2014/0114534 | A1* | 4/2014 | Zhang | H04N 5/23238 701/42 |
| 2014/0340516 | A1* | 11/2014 | Vojtisek | B60R 11/04 348/148 |
| 2015/0109444 | A1* | 4/2015 | Zhang | H04N 7/188 348/148 |
| 2016/0042543 | A1* | 2/2016 | Hashimoto | H04N 5/23229 345/629 |
| 2018/0086271 | A1* | 3/2018 | Kosugi | B60R 1/00 |
| 2018/0154831 | A1* | 6/2018 | Spencer | H04N 7/181 |
| 2018/0304813 | A1* | 10/2018 | Seki | H04N 7/181 |
| 2019/0026947 | A1* | 1/2019 | Herman | B60R 1/00 |
| 2019/0248288 | A1* | 8/2019 | Oba | G06T 3/00 |
| 2020/0086792 | A1* | 3/2020 | Kikuchi | H04N 5/2628 |

OTHER PUBLICATIONS

International Preliminary Report on Patentability and Written Opinion issued in PCT/JP2018/037735; dated Apr. 14, 2020.

The extended European search report issued by the European Patent Office dated Sep. 29, 2020, which corresponds to European Patent Application No. 18865628.4-1209 and is related to U.S. Appl. No. 16/754,366.

\* cited by examiner

… (1)

VEHICLE DISPLAY SYSTEM

TECHNICAL FIELD

The present invention relates to a vehicle display system and more particularly to a vehicle display system for displaying an image of surroundings of an own vehicle.

BACKGROUND ART

Heretofore, there has been known a display system for displaying an image of surroundings of an own vehicle, using an image captured by a camera mounted on the periphery of the own vehicle.

For example, the following Patent Document 1 discloses an image display system configured to subjecting images captured by a plurality of cameras mounted on the periphery of an own vehicle to viewpoint-conversion to create an overhead image like being obtained by imaging the own vehicle from the air over, and display the overhead image together with the images before being subjected to the viewpoint-conversion.

CITATION LIST

Patent Document

Patent Document 1: JP 2011-251681A

SUMMARY OF INVENTION

Technical Problem

However, in the above conventional display system, the overhead image which normally cannot be seen by a human is displayed. Thus, in order to figure out and recognize a positional relationship between the own vehicle and a surrounding second vehicle or obstacle, it is necessary for a driver who looks at the overhead image to perform information processing in the brain based on his/her experiences and inference. Specifically, an image created by the conventional display system has a problem that it is difficult for a driver to intuitively figure out a positional relationship or distance between the own vehicle and a surrounding second vehicle or obstacle, as compared to a case where the driver directly visually views surroundings of the own vehicle.

The present invention has been made to solve the above conventional problem, and an object thereof is to provide a vehicle display system capable of, when displaying an image of surroundings of an own vehicle captured by a vehicle-mounted camera, displaying the image in a manner allowing a driver to more intuitively recognize a positional relationship or distance with respect to a second vehicle or obstacle.

Solution to Technical Problem

In order to achieve the above object, the present invention provides a vehicle display system for displaying an image of surroundings of a vehicle. The vehicle display system comprises: a display configured to display an image thereon; a camera mounted on the vehicle and configured to image surroundings of the vehicle; and a display controller configured to subject an image captured by the camera to mask processing, using a mask image including a semi-transparent portion corresponding to a vehicle body, and a portion corresponding to a window of the vehicle and having a transmittance lower than that of the portion corresponding to the vehicle body, as viewed from a viewpoint of a driver who is driving the vehicle, to generate a masked image, and cause the masked image to be displayed on the display.

In the vehicle display system of the present invention having the above feature, the display controller is configured to subject an image captured by the camera to mask processing, using a mask image including a semi-transparent portion corresponding to a vehicle body, and a portion corresponding to a window of the vehicle and having a transmittance lower than that of the portion corresponding to the vehicle body to generate a masked image. Thus, it is possible to display a second vehicle or obstacle around an own vehicle, in a driver's viewpoint image (image from the viewpoint of a driver which is easily and intuitively figured out by the driver, and further show a positional relationship between the own vehicle and the second vehicle or obstacle by a relationship with the portion corresponding to the vehicle body in the mask image, while lowering the transmittance of a region visually checkable through the window by the driver, thereby reducing the amount of information to be recognized by the driver. This makes it possible to display an image of surroundings of the own vehicle in a manner allowing the driver to intuitively recognize a positional relationship or distance with respect to the second vehicle or obstacle.

Preferably, in the vehicle display system of the present invention, the camera includes a rear camera for imaging a region rearward of the vehicle, and a side camera for imaging a region laterally outward of the vehicle, wherein the display controller is operable, during backward movement of the vehicle, to synthesize a rearward image captured by the rear camera and a lateral image captured by the side camera to generate a single image, and subject the single image to the mask processing, using the mask image, wherein the portion corresponding to the window of the vehicle comprises a portion corresponding to a rear side window and having a transmittance lower than that of the portion corresponding to the vehicle body.

According to this feature, the display controller is operable, during backward movement of the vehicle, to subject a single image generated by synthesizing a rearward image captured by the rear camera and a lateral image captured by the side camera, to the mask processing, using the mask image, wherein the portion corresponding to the window of the vehicle comprises a portion corresponding to a rear side window and having a transmittance lower than that of the portion corresponding to the vehicle body. Thus, during the backward movement of the vehicle, it is possible to display a second vehicle or obstacle located rearward and laterally outward of the own vehicle, while lowering the transmittance of a region visually checkable through the rear side window by the driver, thereby reducing the amount of information to be recognized by the driver. This makes it possible to display an image of surroundings of the own vehicle in a manner allowing the driver to intuitively recognize a positional relationship or distance with respect to a second vehicle or obstacle behind the own vehicle, Preferably, in the vehicle display system of the present invention, the camera includes a front camera for imaging a region forward of the vehicle, and a side camera for imaging a region laterally outward of the vehicle, wherein the display controller is operable, during forward movement of the vehicle, to synthesize a forward image captured by the front camera and a lateral image captured by the side camera to generate a single image, and subject the single image to the mask processing, using the mask image, wherein the portion corresponding to the window of the vehicle comprises a portion corresponding to a front windshield and having a transmittance lower than that of the portion corresponding to the vehicle body.

According to this feature, the display controller is operable, during forward movement of the vehicle, to subject a single image generated by synthesizing a forward image captured by the front camera and a lateral image captured by the side camera, to the mask processing, using the mask image, wherein the portion corresponding to the window of the vehicle comprises a portion corresponding to a front windshield and having a transmittance lower than that of the portion corresponding to the vehicle body. Thus, during the forward movement of the vehicle, it is possible to display a second vehicle or obstacle located forward and laterally outward of the own vehicle, while lowering the transmittance of a region visually checkable through the front windshield by the driver, thereby reducing the amount of information to be recognized by the driver. This makes it possible to display an image of surroundings of the own vehicle in a manner allowing the driver to intuitively recognize a positional relationship or distance with respect to a second vehicle or obstacle ahead of the own vehicle.

Preferably, the vehicle display system of the present invention comprises a vehicle speed detector for detecting a vehicle speed of the vehicle, wherein the display controller is operable, when the detected vehicle speed is equal to or less than a given threshold, to subject the image captured by the camera to the mask processing, using the mask image including the portion corresponding to the window of the vehicle, and, when the detected vehicle speed is greater than the threshold, to subject the image captured by the camera to the mask processing, using a mask image devoid of the portion corresponding to the window of the vehicle.

According to this feature, the display controller is operable, when the detected vehicle speed is greater than the threshold, to subject the image captured by the camera to the mask processing, using a mask image devoid of the portion corresponding to the window of the vehicle. Thus, when the vehicle speed is relatively high, it is possible to display an image having a larger amount of information in a manner allowing the driver to recognize a situation of surroundings of the own vehicle in more detail.

Preferably, in the vehicle display system of the present invention, the mask image includes a portion corresponding to a rear end of the vehicle, wherein a portion corresponding to a rear window of the vehicle comprised in the portion corresponding to the rear end of the vehicle is transparent.

According to this feature, the mask image includes a portion corresponding to a rear end of the vehicle, wherein a portion corresponding to a rear window of the vehicle comprised in the portion corresponding to the rear end of the vehicle is transparent. Thus, it is possible to clearly display a situation of a region rearward of the own vehicle in the portion corresponding to the rear window, while showing a positional relationship between the own vehicle and the second vehicle or obstacle around the own vehicle by a relationship with the portion corresponding to the rear end of the own vehicle in the mask image. This makes it possible to display an image of surroundings of the own vehicle in a manner allowing the driver to intuitively recognize a positional relationship or distance with respect to a second vehicle or obstacle behind the own vehicle.

Effect of Invention

The vehicle display device of the present invention is capable of, when displaying an image of surroundings of an own vehicle captured by a vehicle-mounted camera, displaying the image in a manner allowing a driver to more intuitively recognize a positional relationship or distance with respect to a second vehicle or obstacle.

DESCRIPTION OF EMBODIMENTS

With reference to the drawings, a vehicle display system according to one embodiment of the present invention will now be described.

Figure 1:
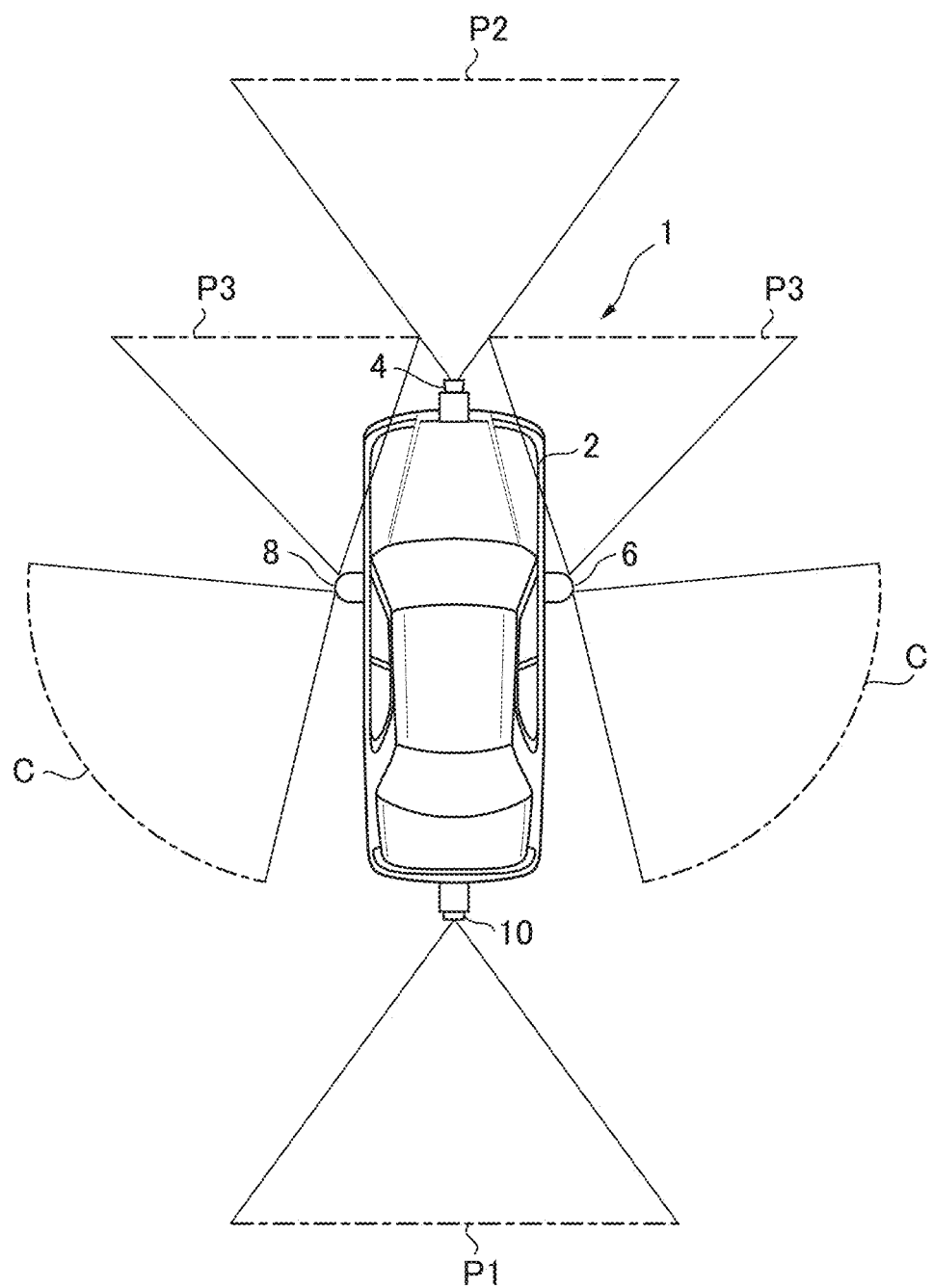
FIG. 1 is a top plan view showing the arrangement of a plurality of cameras equipped in a vehicle display system according to one embodiment of the present invention.
Figure 2:
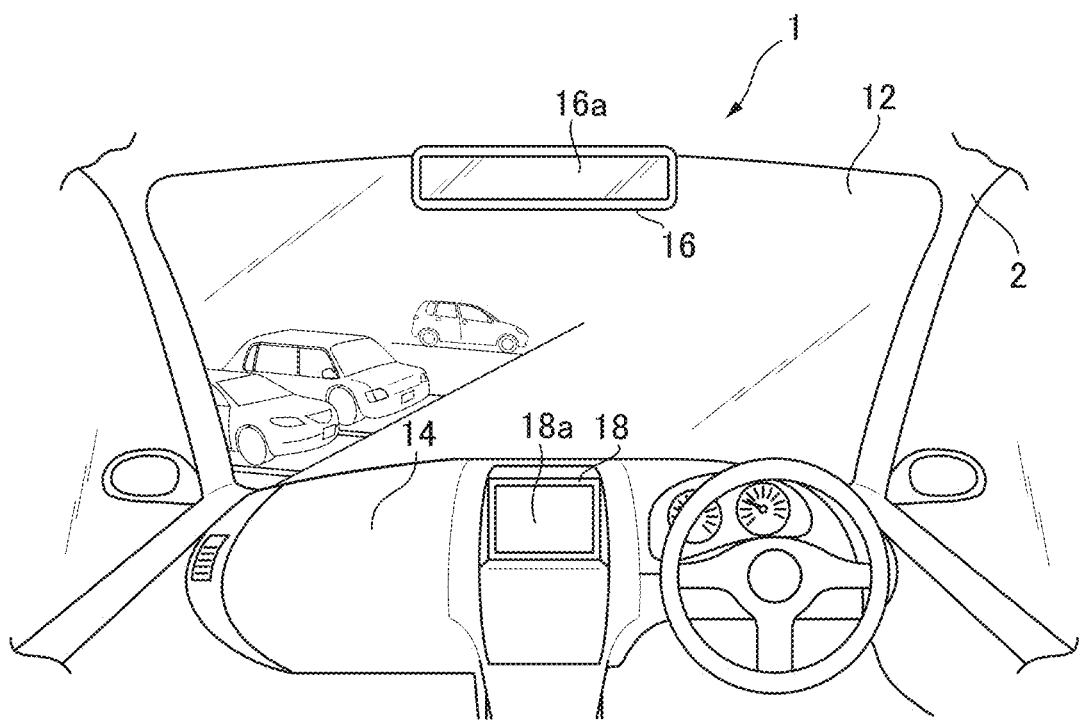
FIG. 2 is a front view showing the vicinity of an instrument panel of a vehicle employing the vehicle display system according to this embodiment.
Figure 3:
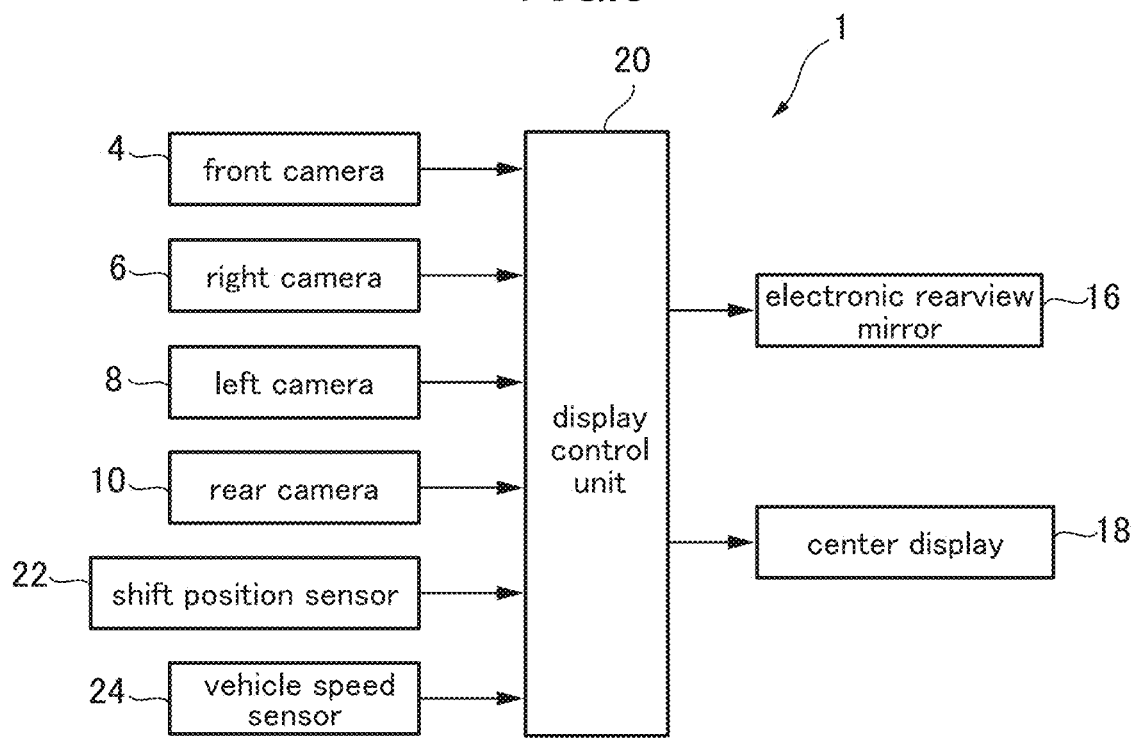
FIG. 3 is a block diagram showing an electrical configuration of the vehicle display system according to this embodiment.

First of all, the configuration of the vehicle display system according to this embodiment will be described with reference to FIGS. 1 to 3. FIG. 1 is a top plan view showing the arrangement of a plurality of cameras equipped in the vehicle display system according to this embodiment of the present invention. FIG. 2 is a front view showing the vicinity of an instrument panel of a vehicle employing the vehicle display system according to this embodiment. FIG. 3 is a block diagram showing an electrical configuration of the vehicle display system according to this embodiment.

In FIG. 1, the reference sign 1 denotes the vehicle display system according to this embodiment. The vehicle display system 1 comprises: a front camera 4 mounted on a front end of the vehicle 2; a right camera 6 mounted on a lower part of a right side mirror of the vehicle 2; a left camera 8 mowited on a lower part of a left side mirror of the vehicle 2; and a rear camera 10 mowited on a rear end of the vehicle 2. Each of the cameras 4, 6, 8, 10 uses a fish-eye lens. The front camera 4 is oriented forwardly with respect to the vehicle 2, and each of the right camera 6 and the left camera 8 is oriented laterally outwardly with respect to the vehicle 2. Further, the rear camera 10 is oriented rearwardly with respect to the vehicle 2. Thus, the front camera 4 is operable to image a region forward of the vehicle 2, and each of the right camera 6 and the left camera 8 is operable to image a region laterally outward of the vehicle 2. Further, the rear camera 10 is operable to image a region rearward of the vehicle 2. That is, through these cameras 4, 6, 8, 10, it is possible to image a wide range from regions forward and rearward of the vehicle 2 to regions laterally outward of respective ones of the side mirrors, while covering a region which is not included in the field-of-view of a driver.

Next, as shown in FIG. 2, at a front end of a vehicle interior (passenger compartment) of the vehicle 2, there are provided a front windshield 12, and an instrument panel 14 disposed just below the front windshield 12 to extend in a vehicle width direction.

The vehicle display system 1 comprises: an electronic rearview mirror 16 provided in a vehicle width-directional central part of an upper end of the front windshield 12 and equipped with a display 16a oriented rearwardly with respect to the vehicle 2; and a center display 18 provided in a vehicle width-directional central part of the instrument panel 14 and equipped with a display 18a oriented rearwardly with respect to the vehicle 2.

As shown in FIG. 3, the vehicle display system 1 further comprises a display control unit 20 configured to generate a single image from images captured by the cameras 4, 6, 8, 10, and cause the single image to be displayed on the electronic rearview mirror 16 or the center display 18. Further, the display control unit 20 is configured to accept an input of data from a shift position sensor 22 operable to detect a speed stage (shift position) of a transmission of the vehicle 2, and a vehicle speed sensor 24 operable to detect a vehicle speed.

Figure 4:
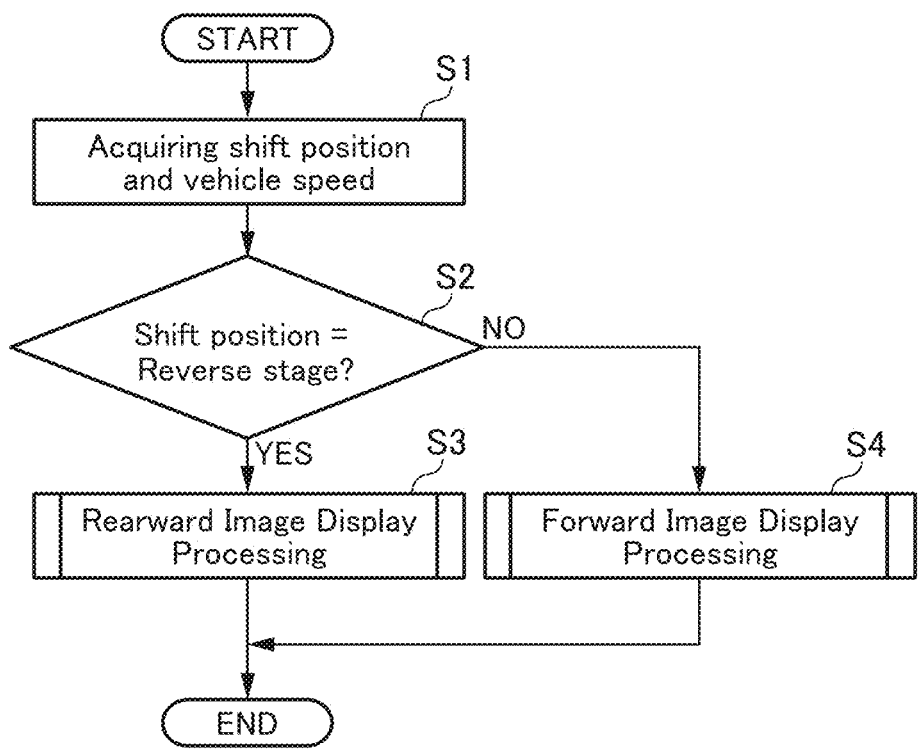
FIG. 4 is a flowchart of display processing to be executed by the vehicle display system according to this embodiment.

The display control unit 20 is composed of a computer which comprises: a CPU; various programs (including a basic control program such as an OS, and an application program capable of being activated on the OS to realize a specific function) to be interpreted and executed by the CPU; and an internal memory such as ROM or RAM for storing therein the programs and a variety of data Next, with reference to FIG. 4, display processing to be executed by the vehicle display system 1 will be described.

FIG. 4 is a flowchart of the display processing to be executed by the vehicle display system 1 according to this embodiment.

The display processing illustrated in FIG. 4 is activated when an ignition switch of the vehicle 2 is turned on, and repeatedly executed with a given cycle period (e.g., 200 ms).

As shown in FIG. 4, upon start of the display processing, in step S1, the display control unit 20 operates to acquire the shift position and the vehicle speed of the vehicle 2, based on data input from the shift position sensor 22 and the vehicle speed sensor 24.

Subsequently, in step S2, the display control unit 20 operates to determine whether or not the acquired shift position is a reverse stage.

As a result, when the acquired shift position is determined to be the reverse stage, the processing routine proceeds to step S3. In the step S3, the display control unit 20 operates to execute rearward image display processing. On the other hand, when the acquired shift position is determined not to be the reverse stage, the processing routine proceeds to step S4, In the step S4, the display control unit 20 operates to execute forward image display processing.

After completion of processing in the step S3 or S4, the display control unit 20 operates to terminate the display processing.

Next, with reference to FIG. 5 and FIG. 6, the rearward image display processing to be executed by the vehicle display system 1 will be described.

Figure 5:
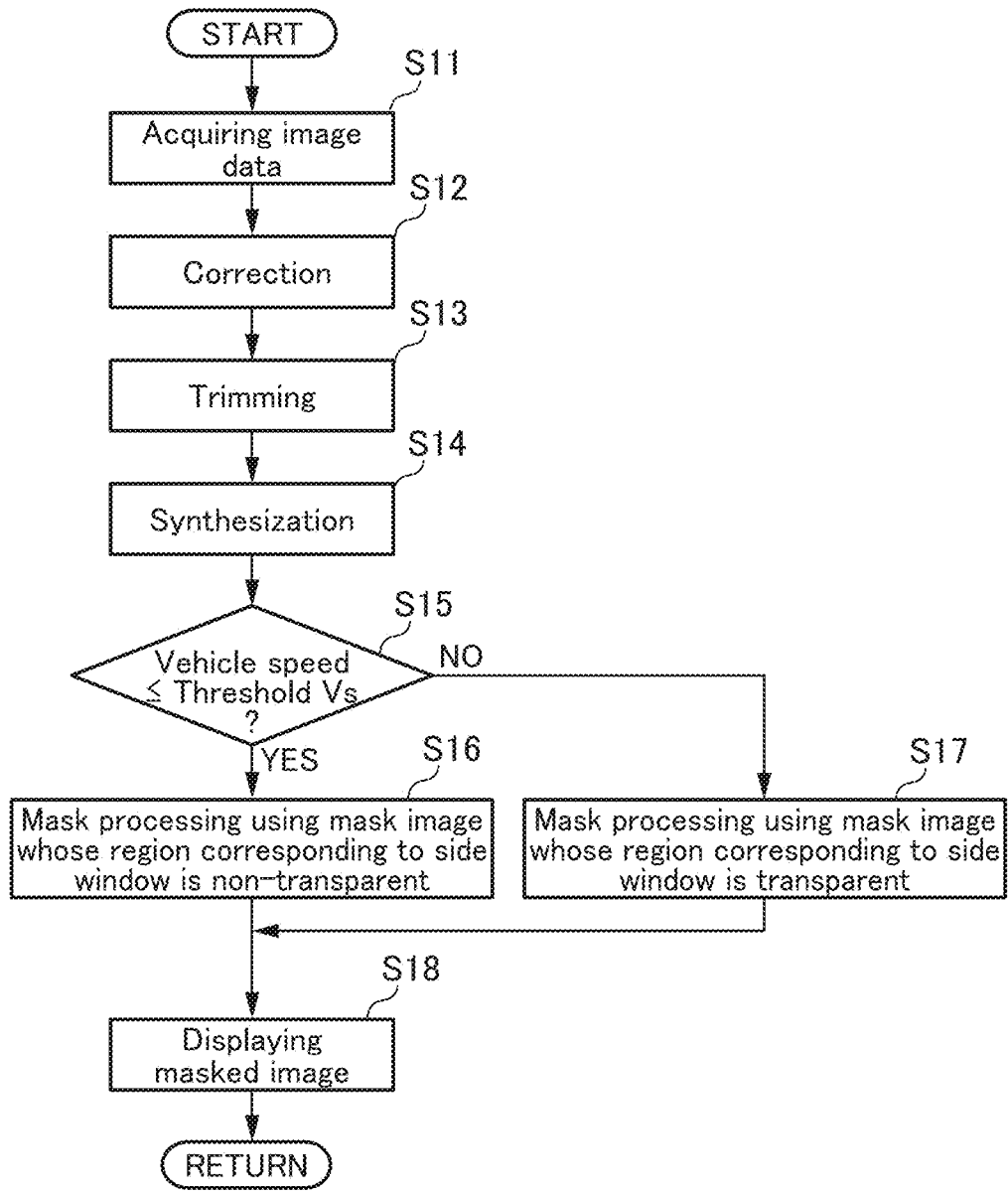
FIG. 5 is a flowchart of rearward view display processing to be executed by the vehicle display system according to this embodiment.

FIG. 5 is a flowchart of the rearward view display processing to be executed by the vehicle display system 1 according to this embodiment. FIG. 6 is a diagram exemplifying images in the process of synthesizing images obtained from the cameras 6, 8, 10 to generate a single image, and a to-be-displayed image obtained by subjecting the single image to mask processing, wherein: chart (a) of FIG. 6 shows images captured by the cameras 6, 8, 10 each employing a fish-eye lens; chart (h) of FIG. 6 shows images obtained by developing the images illustrated in chart (a) of FIG. 6; chart (c) of FIG. 6 shows a single image obtained by trimming and synthesizing the images illustrated in chart (b) of FIG. 6; and chart (d) of FIG. 6 shows a masked image obtained by subjecting the single image to mask processing and displayed on the center display 18.

As shown in FIG. 5, upon start of the rearward image display processing, in step S11, the display control unit 20 operates to acquire two images of regions laterally outward of the vehicle 2 (lateral images SV) captured by the right camera 6 and the left camera 8, and an image of a region rearward of the vehicle 2 (rearward image RV) captured by the rear camera 10. The acquired images are distorted as shown in chart (a) of FIG. 6, because each of the cameras 6, 8, 10 employs a fish-eye lens, as mentioned above. The display control unit 2C) operates to acquire each of the images as a mirror-reversed image in which an actual view from the position of each of the cameras 6, 8, 10 is bilaterally reversed, as shown in chart (a) of FIG. 6.

Subsequently, in step S12, the display control unit 20 operates to correct each of the acquired images. Specifically, the display control unit 20 operates to subject each of the lateral images SV captured by the right camera 6 and the left camera 8 to development (cylindrical development) along a virtual cylindrical surface C (indicated by an arc in FIG. 1) whose central axis line extends in an upward-downward direction of the vehicle 2, and subject the rearward image RV captured by the rear camera 10 to development (planar development) along a virtual planar surface P1 (indicated by a straight line in FIG. 1) perpendicular to a forward-rearward (longitudinal) direction of the vehicle 2. Through this processing, the distortion in each of the images is corrected as shown in chart (b) of FIG. 6. Further, the display control unit 20 operates to projection-transform each of the developed images into an image from the viewpoint of the driver.

Subsequently, in step S13, the display control unit 20 operates to trim each of the images corrected in the step S12. An imaging range of the rear camera 10 and an imaging range of the right camera 6 and the left camera 8 partly overlap each other, so that it is necessary to remove the overlapping area. Further, each of the acquired images includes an area unnecessary when the driver checks a region rearward of the vehicle 2. Therefore, the display control unit 20 operates to trim each of the corrected images along a predetermined boundary, using, e.g., coordinate information. In the example illustrated in chart (b) of FIG. 6, the display control unit 20 operates to cut out an area surrounded by a rectangular boundary (indicated by the one-dot chain line in chart (h) of FIG. 6) from each of the corrected images.

Subsequently, in step S14, the display control unit 20 operates to synthesize the images trimmed in the step S13, to generate a single image. Through this processing, the single image IT is obtained as an image presenting a wide range from a region rearward of the vehicle 2 to a region laterally outward of the vehicle 2, as shown in chart (c) of FIG. 6.

Subsequently, in step S15, the display control unit 20 operates to determine whether or not the vehicle speed acquired in the step S1 of the display processing in FIG. 4 is equal to or less than a given threshold Vs.

As a result, when the acquired vehicle speed is determined to be equal to or less than the threshold Vs, the processing sub-routine proceeds to step S16. In the step S16, the display control unit 20 operates to subject the single image IT synthesized in the step S14 to mask processing, using a mask image MR which is preliminarily created and stored in a memory or the like and whose portion corresponding to a side window is non-transparent.

Figure 6:
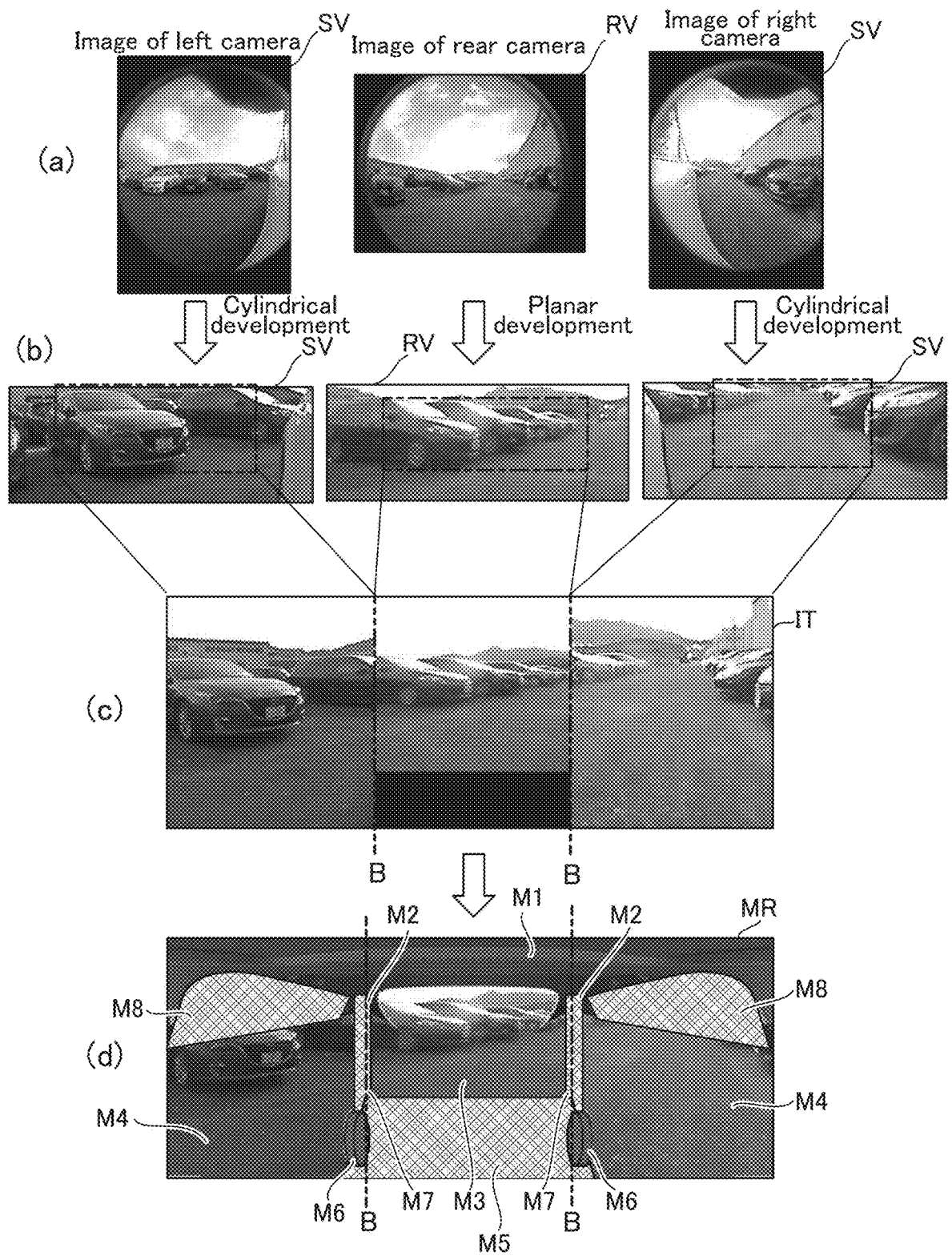
FIG. 6 is a diagram exemplifying images in the process of synthesizing images obtained from a right camera, a left camera and a rear camera to generate a single image, and a to-be-displayed image obtained by subjecting the single image to mask processing.

As shown in chart (d) of FIG. 6, the mask image MR includes: a portion M1 corresponding to a ceiling of the vehicle 2; two portions M2 each corresponding to a respective one of right and left rearmost pillars; a portion M3 corresponding to a rear gate at the rear end of the vehicle 2, two portions M4 each corresponding to a respective one of right and left rear quarter panels; a portion M5 (indicating a planar shape of the vehicle 2) corresponding to an underbody; two portions M6 each corresponding to a respective one of right and left rear wheels; two portions M7 each corresponding to a respective one of a left rear corner and a right rear corner of the vehicle 2 extending upwardly, respectively, from vehicle width-directional opposite ends of a rear edge of the underbody of the vehicle 2; and two portions M8 each corresponding to a respective one of right and left rear side windows. Among them, the portions M2 each corresponding to a respective one of the rearmost pillars of the vehicle 2, the portion M5 corresponding to the underbody, and the portions M7 each corresponding to a respective one of the left rear corner and the right rear corner of the vehicle 2, and the portions M8 each corresponding to a respective one of the rear side windows are set to become non-transparent, and the remaining portions are set to become semi-transparent. Further, the portions M2 each corresponding to a perspective one of the rearmost pillars of the vehicle 2, and the portions M7 each corresponding to a corresponding one of the left rear corner and the right rear corner of the vehicle 2 are arranged at positions overlapping two boundaries B between adjacent ones of the images synthesized in the step S14.

The mask image MR to be used in the mask processing for the single image IT in the step S16 does not include a portion corresponding to a rear window of the vehicle 2. Thus, in a to-be-displayed image after the mask processing using this mask image MR, the portion corresponding to the rear window is set to become transparent, as shown in chart (d) of FIG. 6.

On the other hand, when, in the step S15, the acquired vehicle speed is determined not to be equal to or less than the threshold Vs (determined to be greater than the threshold Vs), the processing sub-routine proceeds to step S17. In the step S17, the display control unit 20 operates to subject the single image IT synthesized in the step S14 to mask processing, using a mask image MR which is preliminarily created and stored in a memory or the like and whose portion corresponding to a side window is transparent.

In this case, the mask image MR includes: a portion M1 corresponding to the ceiling of the vehicle 2; two portions M2 each corresponding to a respective one of the rearmost pillars; a portion M3 corresponding to the rear gate at the rear end of the vehicle 2; two portions M4 each corresponding to a respective one of the rear quarter panels; a portion M5 corresponding to the underbody; two portions M6 each corresponding to a respective one of the rear wheels; and two portions M7 each corresponding to a respective one of the left rear corner and the right rear corner of the vehicle 2 extending upwardly, respectively, from the vehicle width-directional opposite ends of the rear edge of the underbody of the vehicle 2, as with the mask image MR illustrated in chart (d) of FIG. 6, but does not include two portions each corresponding to a respective one of the rear side windows. Thus, in a to-be-displayed image D obtained through the mask processing using this mask image MR, the portion corresponding to the rear window and the portions each corresponding to a respective one of the rear side windows are set to become transparent.

After the step S16 or S17, the processing sub-routine proceeds to step S18. In the step S18, the display control unit 20 operates to cause the to-be-displayed image D obtained through the mask processing using this mask image MR in the step S16 or S17 to be displayed on the display 18a of the center display 18.

The mask image MR includes the portion M5 corresponding to the underbody, the portions M6 each corresponding to a respective one of the rear wheels, and the portions M7 each corresponding to a respective one of the left rear corner and the right rear corner of the vehicle 2, so that it is possible to show a positional relationship between the own vehicle 2 and a second vehicle or obstacle located rearward or laterally outward of the own vehicle 2 by a relationship with a portion corresponding to a structural member of the own vehicle 2 in the mask image MR, thereby allowing the driver to intuitively recognize the positional relationship or distance between the own vehicle 2 and the second vehicle or obstacle.

Further, when the vehicle speed is equal to or less than the given threshold Vs, the portions each corresponding to a respective one of the rear side windows in the to-be-displayed image D are set to become non-transparent by the mask image MR, so that it is possible to allow a region visually checkable through the rear side windows by slightly turning the driver's face to the right and left to be invisibly hidden by the mask image MR, thereby reducing the amount of information to be recognized by the driver. On the other hand, the portion corresponding to the rear window, which can visually views only if the driver largely turns his/her body rearwardly, is transparently displayed, so that it is possible to clearly display a situation of a region rearward of the own vehicle. This allows the driver to intuitively recognize a positional relationship or distance with respect to a second vehicle or obstacle behind the own vehicle.

Further, the portion M1 corresponding to the ceiling of the vehicle 2 and the portions M2 each corresponding to a respective one of the rearmost pillars of the vehicle 2 in the mask image MR overlap the boundaries B between adjacent ones of the images synthesized in the step S14, so that, even when a second vehicle behind the own vehicle is located at a position crossing the boundary B between the adjacent images, a double image or image distortion in the vicinity of the boundary B can be invisibly hidden by the mask image MR. This makes it possible to prevent a situation where, due to the occurrence of a double image or image distortion of a second vehicle behind the own vehicle in the vicinity of the boundary B, the driver erroneously figures out a positional relationship between the own vehicle 2 and the second vehicle or a distance with respect to the second vehicle.

After completion of the step S18, the display control unit 20 operates to terminate the rearward image display processing, and the processing sub-routine returns to the main routine, i.e., the display processing.

Next, with reference to FIG. 7 and FIG. 8, the forward image display processing to be executed by the vehicle display system 1 will be described.

Figure 7:
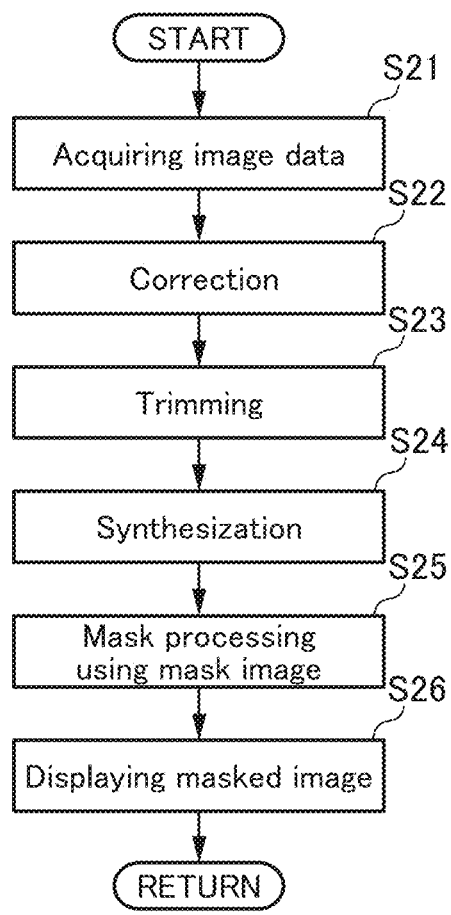
FIG. 7 is a flowchart of forward view display processing to be executed by the vehicle display system according to this embodiment.

FIG. 7 is a flowchart of the forward view display processing to be executed by the vehicle display system 1 according to this embodiment. FIG. 8 is a diagrams exemplifying images in the process of synthesizing images obtained from the front camera 4, the right camera 6 and the left camera 8 to generate a single image, and a to-be-displayed image obtained by subjecting the single image to mask processing, wherein: chart (a) of FIG. 8 shows images captured by the front camera 4, the right camera 6 and the left camera 8 each employing a fish-eye lens; chart (b) of FIG. 8 shows images obtained by developing the images illustrated in chart (a) of FIG. 8; chart (c) of FIG. 8 shows a single image obtained by trimming and synthesizing the images illustrated in chart (b) of FIG. 8; and chart (d) of FIG. 8 shows a masked image obtained by subjecting the single image illustrated in chart (c) of FIG. 8 to mask processing and displayed on the center display 18.

As shown in FIG. 7, upon start of the forward image display processing, in step S21, the display control unit 20 operates to acquire an image of a region forward of the vehicle 2 (forward image FV) captured by the front camera 4, and two images of regions laterally outward and obliquely forward of the vehicle 2 (lateral and obliquely forward images SV) captured by the right camera 6 and the left camera 8. The acquired images are distorted as shown in chart (a) of FIG. 8, because each of the cameras 4, 6, 8 employs a fish-eye lens, as mentioned above.

Subsequently, in step S22, the display control unit 20 operates to correct each of the acquired images. Specifically, the display control unit 20 operates to subject the forward image FY captured by the front camera 4 to development (planar development) along a virtual planar surface P2 (indicated by a straight line in FIG. 1) perpendicular to the forward-rearward direction of the vehicle 2, and subject each of the lateral and obliquely forward images SV captured by the right camera 6 and the left camera 8 to development (planar development) along a virtual planar surface P3 (indicated by a straight line in FIG. 1) perpendicular to the forward-rearward direction of the vehicle 2. Through this processing, the distortion in each of the images is corrected as shown in chart (b) of FIG. 9. Further, the display control unit 20 operates to projection-transform each of the developed images into an image from the viewpoint of the driver.

Subsequently, in step S23, the display control unit 20 operates to trim each of the images corrected in the step S22. An imaging range of the front camera 4 and an imaging range of the right camera 6 and the left camera 8 partly overlap each other, so that it is necessary to remove the overlapping area. Further, each of the images acquired in the step S21 includes an area unnecessary when the driver checks a region forward of the vehicle 2. Therefore, the display control unit 20 operates to trim each of the corrected images along a predetermined boundary, using, e.g., coordinate information. In the example illustrated in chart (b) of FIG. 8, the display control unit 20 operates to cut out an area surrounded by a rectangular boundary (indicated by the one-dot chain line in chart (b) of FIG. 8) from each of the images corrected in the step S22.

Subsequently, in step S24, the display control unit 20 operates to synthesize the images trimmed in the step S23, to generate a single image. Through this processing, the single image IT is obtained as an image presenting a wide range from a region forward of the vehicle 2 to a region laterally outward of the vehicle 2, as shown in chart (c) of FIG. 8.

Subsequently, in step S25, the display control unit 20 operates to subject the single image IT synthesized in the step S24 to mask processing, using a mask image MF which is preliminarily created and stored in a memory or the like and has portions each corresponding to a respective one of a plurality of front structural members of the vehicle 2.

Figure 8:
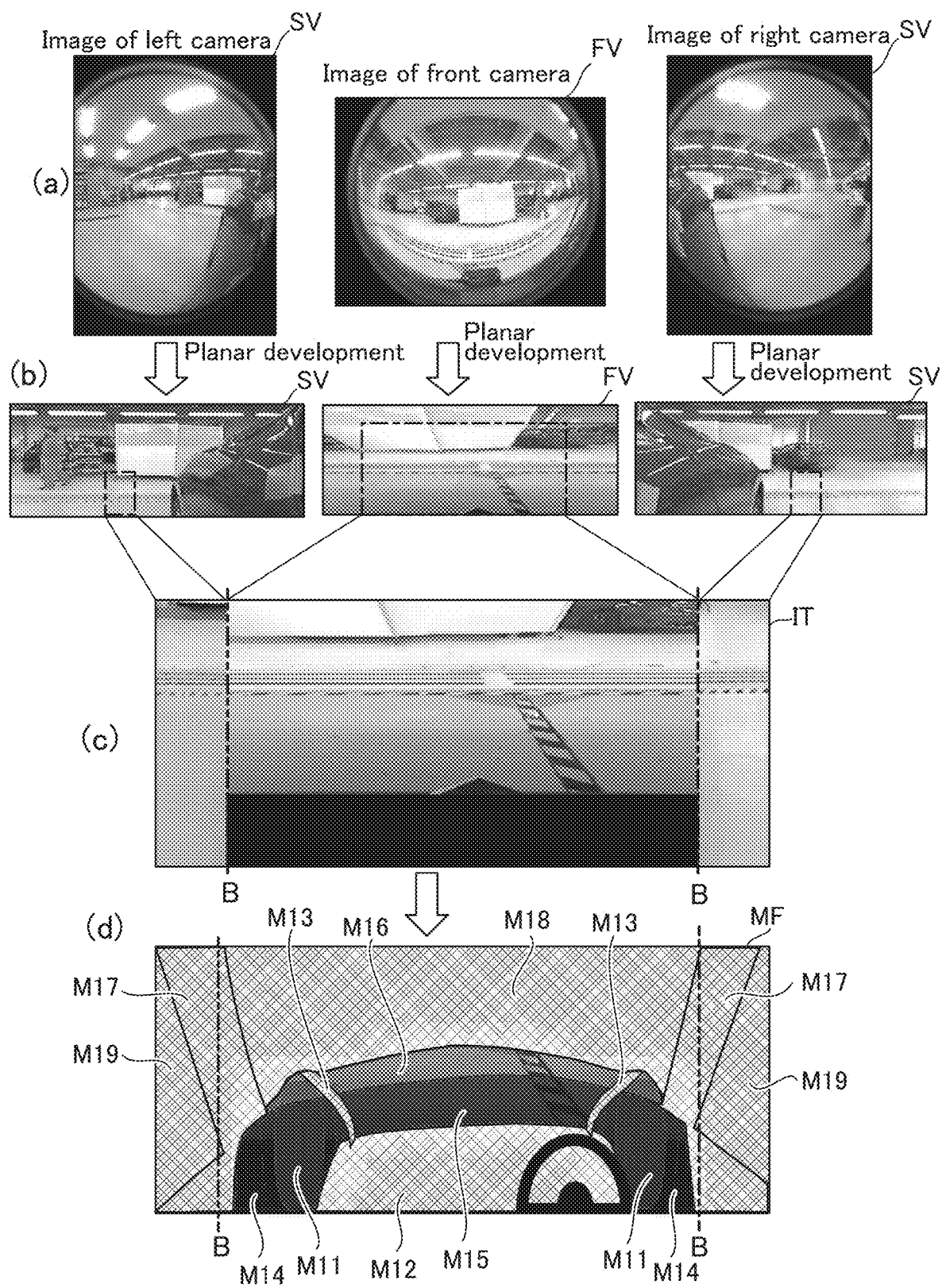
FIG. 8 is a diagram exemplifying images in the process of synthesizing images obtained from the right camera, the left camera and a front camera to generate a single image, and a to-be-displayed image obtained by subjecting the single image to mask processing.

As shown in chart (d) of FIG. 8, the mask image MF includes: two portions M11 each corresponding to a respective one of right and left front wheels; a portion M12 (indicating a planar shape of the vehicle 2) corresponding to the underbody, two portions M13 each corresponding to a respective one of a left front corner and a right front corner of the vehicle 2 extending upwardly, respectively, from vehicle width-directional opposite ends of a front edge of the underbody of the vehicle 2; two portions M14 each corresponding to a respective one of right and left front quarter panels; a portion M15 corresponding to the instrument panel 14 of the vehicle 14; a portion M16 corresponding to a hood (bonnet) of the vehicle 2; two portions M17 each corresponding to a respective one of right and left frontmost pillars; a portion M18 corresponding to the front windshield 12; and two portions M19 each corresponding to a respective one of right and left front side windows. Among them, the portion M12 corresponding to the underbody of the vehicle 2, the portions M13 each corresponding to a respective one of the left front corner and the right front corner of the vehicle 2, the portions M17 each corresponding to a respective one of the frontmost pillars, the portion M18 corresponding to the front windshield 12 and the portions M19 each corresponding to a respective one of the front side windows are set to become non-transparent, and the remaining portions are set to become semi-transparent.

Subsequently, in step S26, the display control unit 20 operates to cause a to-be-displayed image D obtained through the mask processing using the above mask image MF in the step S25 to be displayed on the display 18a of the center display 18.

The mask image MF includes the portions M11 each corresponding to a respective one of the front wheels, the portion M12 corresponding to the underbody and the portions M13 each corresponding to a respective one of the left front corner and the right front corner of the vehicle 2, so that it is possible to show a positional relationship between the own vehicle 2 and a second vehicle or obstacle ahead of the own vehicle 2 by a relationship with a portion corresponding to a structural member of the own vehicle 2 in the mask image MF, thereby allowing the driver to intuitively recognize the positional relationship or distance between the own vehicle 2 and the surrounding second vehicle or obstacle lying at a blind spot in the field-of-view of the driver. Further, the portion corresponding to the front windshield 12 in the to-be-displayed image D is set to become non-transparent by the mask image MR, so that it is possible to allow a region visually checkable by the driver to be invisibly hidden by the mask image MF, thereby reducing the amount of information to be recognized by the driver. This allows the driver to intuitively recognize a positional relationship or distance with respect to a second vehicle or obstacle ahead of the own vehicle, lying at a blind spot in the field-of-view of the driver.

After completion of the step S26, the display control unit 20 operates to terminate the forward image display processing, and the processing sub-routine returns to the main routine, i.e., the display processing.

Next, some modifications of the above embodiment will be described.

The above embodiment has been described based on an example in which the display control unit 20 is configured to cause a masked image to be displayed on the display 18a of the center display 18. Alternatively, the display control unit 20 may be configured to cause a masked image to be displayed on the electronic rearview mirror 16.

Further, in the forward image display processing, the display control unit 20 may be configured to, when the vehicle speed is equal to or less than the threshold Vs, subject the single image IT to mask processing, using a mask image MF including a non-transparent portion corresponding to the front windshield 12, and, when the vehicle speed is greater than the threshold Vs, subject the single image IT to mask processing, using a mask image MF devoid of the portion corresponding to the front windshield 12.

In this case, when the vehicle speed is equal to or less than the threshold Vs, it is possible to allow a region visually checkable through the front windshield 12 by the driver to be invisibly hidden by the mask image MF, thereby reducing the amount of information to be recognized by the driver. This allows the driver to intuitively recognize a positional relationship or distance with respect to a second vehicle or obstacle in front of the own vehicle. Further, when the vehicle speed is greater than the threshold Vs, it is possible to clearly display a situation of a region ahead of the own vehicle 2 in the portion corresponding to the front windshield 12, i.e., display an image allowing the driver to recognize a situation around the own vehicle in more detail.

The above embodiment has been described based on an example in which, in the mask image MR, the portions M2 each corresponding to a respective one of the rearmost pillars of the vehicle 2, the portions M7 each corresponding to a respective one of the left rear corner and the right rear corner of the vehicle 2 and the portions M8 each corresponding to a respective one of the rear side windows are set to become non-transparent. Alternatively, each of these portions may be set to become semi-transparent to have a transmittance lower than that of the portions M4 each corresponding to a respective one of the rear quarter panels.

The above embodiment has been described based on an example in which, in the mask image MF, the portions M13 each corresponding to a respective one of the left front corner and the right front corner of the vehicle 2, the portions M17 each corresponding to a respective one of the frontmost pillars, the portion M18 corresponding to the front windshield 12 and the portions M19 each corresponding to a respective one of the front side windows are set to become non-transparent. Alternatively, each of these portions may be set to become semi-transparent to have a transmittance lower than that of the portions M14 each corresponding to a respective one of the front quarter panels.

The shape of each of the mask images MR, MF may be appropriately changed according to the structure of the vehicle 2. For example, when the vehicle 2 is a sedan-type vehicle, a portion corresponding to a trunk lid at the rear end of the vehicle 2 may be provided, in place of the portion M3 corresponding to the rear gate. Further, two portions each corresponding to a respective one of right and left front or rear door panels may be added. Each of the mask images MR, MF needs not necessarily include portions corresponding to the ceiling, the pillars, the rear gate, the rear or front quarter panels, the hood and others.

The above embodiment has been described based on an example in which the right camera 6 is mounted on the lower part of the right side mirror of the vehicle 2, and the left camera 8 is mounted on the lower part of the left side mirror of the vehicle 2. Alternatively, each of the cameras 6, 8 may be mounted on an upper part of an end of a corresponding one of the side mirrors, or may be mounted on another location of a respective one of right and left side surface of the vehicle 2.

The above embodiment has been described based on an example in Which each of the cameras 4, 6, 8, 10 employs a fish-eye lens. Alternqatiberly, any type of wide-angle lens other than the fish-eye lens may be employed.

Next, advantageous effects of the vehicle display system 1 according to the above embodiment and the modifications of the above embodiment will be described.

In the vehicle display system according to the above embodiment and the modifications of the above embodiment, the display control unit 20 is configured to subject an image captured by the camera to mask processing, using a mask image MR or MF including a semi-transparent portion corresponding to a vehicle body, and a portion corresponding to a window of the vehicle 2 and having a transmittance lower than that of the portion corresponding to the vehicle body to generate a to-be-displayed image D. Thus, it is possible to display a second vehicle or obstacle around the own vehicle 2, in a driver's viewpoint image (image from the viewpoint of a driver) which is easily and intuitively figured out by the driver, and further show a positional relationship between the own vehicle and the second vehicle or obstacle by a relationship with the portion corresponding to the vehicle body in the mask image MR or MF while lowering the transmittance of a region visually checkable through the window by the driver, thereby reducing the amount of information to be recognized by the driver. This makes it possible to display an image of surroundings of the own vehicle 2 in a manner allowing the driver to intuitively recognize a positional relationship or distance with respect to the second vehicle or obstacle.

In the vehicle display system according to the above embodiment and the modifications of the above embodiment, the display control unit 20 is operable, during backward movement of the vehicle 2, to subject a single image IT generated by synthesizing a rearward image RV captured by the rear camera 10 and lateral images SV captured by the right camera 6 and the left camera 8, to the mask processing, using the mask image MR, wherein the portion corresponding to the window of the vehicle 2 comprises a portion corresponding to a rear side window of the vehicle 2 and having a transmittance lower than that of the portion corresponding to the vehicle body. Thus, during the backward movement of the vehicle 2, it is possible to display a second vehicle or obstacle located rearward and laterally outward of the own vehicle 2, while lowering the transmittance of a region visually checkable through the rear side window by the driver, thereby reducing the amount of information to be recognized by the driver. This makes it possible to display an image of surroundings of the own vehicle 2 in a manner allowing the driver to intuitively recognize a positional relationship or distance with respect to a second vehicle or obstacle behind the own vehicle.

In the vehicle display system according to the above embodiment and the modifications of the above embodiment, the display control unit 20 is operable, during forward movement of the vehicle 2, to subject a single image IT generated by synthesizing a forward image FV captured by the front camera 4 and lateral images SV captured by the side cameras, to the mask processing, using the mask image MF, wherein the portion corresponding to the window of the vehicle 2 comprises a portion corresponding to a front windshield and having a transmittance lower than that of the portion corresponding to the vehicle body. Thus, during the forward movement of the vehicle 2, it is possible to display a second vehicle or obstacle located forward and laterally outward of the own vehicle 2, while lowering the transmittance of a region visually checkable through the front windshield 12 by the driver, thereby reducing the amount of information to be recognized by the driver. This makes it possible to display an image of surroundings of the own vehicle 2 in a manner allowing the driver to intuitively recognize a positional relationship or distance with respect to a second vehicle or obstacle ahead of the own vehicle.

In the vehicle display system according to the above embodiment and the modifications of the above embodiment, the display control unit 20 is operable, when the detected vehicle speed is greater than the threshold, to subject the image captured by the camera to the mask processing, using a mask image devoid of the portion corresponding to the window of the vehicle 2. Thus, when the vehicle speed is relatively high, it is possible to display an image having a larger amount of information in a manner allowing the driver to recognize a situation of surroundings of the own vehicle 2 in more detail.

In the vehicle display system according to the above embodiment and the modifications of the above embodiment, the mask image MR includes a portion M3 corresponding to a rear end of the vehicle 2, wherein a portion corresponding to a rear window of the vehicle comprised in the portion M3 corresponding to the rear end of the vehicle is transparent. Thus, it is possible to clearly display a situation of a region rearward of the own vehicle 2 in the portion corresponding to the rear window, while showing a positional relationship between the own vehicle 2 and the second vehicle or obstacle around the own vehicle 2 by a relationship with the portion M3 corresponding to the rear end of the own vehicle 2 in the mask image MR. This makes it possible to display an image of surroundings of the own vehicle 2 in a manner allowing the driver to intuitively recognize a positional relationship or distance with respect to a second vehicle or obstacle behind the own vehicle.

LIST OF REFERENCE SIGNS

1: vehicle display system
2: vehicle
4: front camera
6: right camera
8: left camera
10: rear camera
12: front windshield
14: instrument panel
16: electronic rearview mirror
16a, 18a display
18: center display
20: display control unit
22: shift position sensor
24: vehicle speed sensor
SV: lateral image
RV: rearward image
FV: forward image
C: Virtual cylindrical surface
P1, P2, P3: virtual planar surface
IT: single image
D: to-be-displayed image
MR, MF: mask image
MI: portion corresponding to ceiling
M2: portion corresponding to each pillar
M3: portion corresponding to rear gate
M4: portion corresponding to each rear quarter panel
M5: portion corresponding to underbody
M6: portion corresponding to each rear wheel
M7: portion corresponding to each of left rear corner and right rear corner
M8: portion corresponding to each rear side window
M11: portion corresponding to each front wheel
M12: portion corresponding to underbody
M13: portion corresponding to each of left rear corner and right rear corner
M14: portion corresponding to each front quarter panel
M15: portion corresponding to instrument panel
M16: portion corresponding to hood
M17: portion corresponding to each pillar
M18: portion corresponding to front windshield
M19: portion corresponding to each front side window
B: boundary

The invention claimed is:

1. A vehicle display system for displaying an image of surroundings of a vehicle, comprising:
   a display configured to display an image thereon;
   a camera mounted on the vehicle and configured to image surroundings of the vehicle; and
   a display controller configured to subject an image captured by the camera to mask processing, using a mask image including a semi-transparent portion corresponding to a vehicle body, and a portion corresponding to a window of the vehicle and having a transmittance lower than that of the portion corresponding to the vehicle body, as viewed from a viewpoint of a driver who is driving the vehicle, to generate a masked image, and cause the masked image to be displayed on the display, wherein
   the camera includes a rear camera for imaging a region rearward of the vehicle, and a side camera for imaging a region laterally outward of the vehicle, and
   the display controller is operable, during backward movement of the vehicle, to synthesize a rearward image captured by the rear camera and a lateral image captured by the side camera to generate a single image, and subject the single image to the mask processing, using the mask image, wherein the portion corresponding to the window of the vehicle comprises a portion corresponding to a rear side window and having a transmittance lower than that of the portion corresponding to the vehicle body.

2. The vehicle display system as recited in claim 1, wherein
   the camera includes a front camera for imaging a region forward of the vehicle, and a side camera for imaging a region laterally outward of the vehicle, and wherein
   the display controller is operable, during forward movement of the vehicle, to synthesize a forward image captured by the front camera and a lateral image captured by the side camera to generate a single image, and subject the single image to the mask processing, using the mask image, wherein the portion corresponding to the window of the vehicle comprises a portion corresponding to a front windshield and having a transmittance lower than that of the portion corresponding to the vehicle body.

3. The vehicle display system as recited in claim 1, which comprises a vehicle speed detector for detecting a vehicle speed of the vehicle, wherein
   the display controller is operable, when the detected vehicle speed is equal to or less than a given threshold, to subject the image captured by the camera to the mask processing, using the mask image including the portion corresponding to the window of the vehicle, and, when the detected vehicle speed is greater than the threshold, to subject the image captured by the camera to the mask processing, using a mask image devoid of the portion corresponding to the window of the vehicle.

4. The vehicle display system as recited in claim 1, wherein the mask image includes a portion corresponding to a rear end of the vehicle, wherein a portion corresponding to a rear window of the vehicle comprised in the portion corresponding to the rear end of the vehicle is transparent.

5. A vehicle display system for displaying an image of surroundings of a vehicle, comprising:
   a display configured to display an image thereon;
   a camera mounted on the vehicle and configured to image surroundings of the vehicle; and
   a display controller configured to subject an image captured by the camera to mask processing, using a mask image including a semi-transparent portion corresponding to a vehicle body, and a portion corresponding to a window of the vehicle and having a transmittance lower than that of the portion corresponding to the vehicle body, as viewed from a viewpoint of a driver who is driving the vehicle, to generate a masked image, and cause the masked image to be displayed on the display, wherein
   the camera includes a front camera for imaging a region forward of the vehicle, and a side camera for imaging a region laterally outward of the vehicle, and
   the display controller is operable, during forward movement of the vehicle, to synthesize a forward image captured by the front camera and a lateral image captured by the side camera to generate a single image, and subject the single image to the mask processing, using the mask image, wherein the portion corresponding to the window of the vehicle comprises a portion corresponding to a front windshield and having a transmittance lower than that of the portion corresponding to the vehicle body.

6. The vehicle display system as recited in claim 5, further comprising a vehicle speed detector for detecting a vehicle speed of the vehicle, wherein
   the display controller is operable, when the detected vehicle speed is equal to or less than a given threshold, to subject the image captured by the camera to the mask processing, using the mask image including the portion corresponding to the window of the vehicle, and, when the detected vehicle speed is greater than the threshold, to subject the image captured by the camera to the mask processing, using a mask image devoid of the portion corresponding to the window of the vehicle.

7. The vehicle display system as recited in claim 5, wherein the mask image includes a portion corresponding to a rear end of the vehicle, wherein a portion corresponding to a rear window of the vehicle comprised in the portion corresponding to the rear end of the vehicle is transparent.

* * * * *